US 9,780,839 B2

(12) United States Patent
Goma et al.

(10) Patent No.: US 9,780,839 B2
(45) Date of Patent: Oct. 3, 2017

(54) POWER RECEPTION DEVICE, POWER TRANSMISSION DEVICE, AND POWER TRANSMISSION SYSTEM

(71) Applicant: Murata Manufacturing Co., Ltd., Nagaokakyo-shi, Kyoto-fu (JP)

(72) Inventors: Shinji Goma, Nagaokakyo (JP); Nobuhito Tsubaki, Nagaokakyo (JP); Noboru Kato, Nagaokakyo (JP); Tsuyoshi Suesada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 187 days.

(21) Appl. No.: 14/719,417

(22) Filed: May 22, 2015

(65) Prior Publication Data
US 2015/0256228 A1  Sep. 10, 2015

Related U.S. Application Data

(63) Continuation of application No. PCT/JP2013/073317, filed on Aug. 30, 2013.

(30) Foreign Application Priority Data

Jan. 21, 2013  (JP) .................... 2013-008082

(51) Int. Cl.
*H04B 5/00* (2006.01)
*H01Q 7/00* (2006.01)
(Continued)

(52) U.S. Cl.
CPC ............. *H04B 5/0037* (2013.01); *H01Q 7/00* (2013.01); *H02J 5/005* (2013.01); *H02J 17/00* (2013.01); *H04B 5/0075* (2013.01)

(58) Field of Classification Search
None
See application file for complete search history.

(56) References Cited

U.S. PATENT DOCUMENTS 6,040,773 A  3/2000 Vega et al.
9,627,760 B2 * 4/2017 Tsubaki ................. H01Q 7/00
(Continued)

FOREIGN PATENT DOCUMENTS

JP  H07-134894 A   5/1995
JP  H11-513518 A  11/1999
(Continued)

OTHER PUBLICATIONS

International Search Report for PCT/JP2013/073317, dated Oct. 29, 2013.
(Continued)

*Primary Examiner* — Daniel Cavallari
*Assistant Examiner* — James Evans
(74) *Attorney, Agent, or Firm* — Arent Fox LLP

(57) ABSTRACT

An active electrode and a passive electrode are electrically field-coupled with an active electrode and a passive electrode provided in a power transmission device, respectively. Power in a high frequency voltage excited on the active electrode and the passive electrode is supplied to a mobile unit via a step-down transformer, a rectification smoothing circuit, and a DC-DC converter. A CPU turns off switches when wireless communication is carried out. The passive electrode functions as a booster antenna that is magnetically field-coupled with an antenna coil. A high frequency signal outputted from an RF circuit is transmitted via the antenna coil and the passive electrode, and a high frequency signal transmitted from the power transmission circuit is inputted, via the passive electrode and the antenna coil, to the RF circuit.

11 Claims, 13 Drawing Sheets

(51) Int. Cl.
*H02J 50/05* (2016.01)
*H02J 17/00* (2006.01)
*H02J 5/00* (2016.01)

(56) References Cited

U.S. PATENT DOCUMENTS

2012/0223149 A1* 9/2012 Kato .................... H01Q 1/2216
235/492
2012/0262005 A1 10/2012 Camurati et al.
2013/0146671 A1* 6/2013 Grieshofer ....... G06K 19/07794
235/492
2013/0207852 A1* 8/2013 Nakano ................ H01Q 1/2225
343/702
2014/0340273 A1 11/2014 Kato et al.

FOREIGN PATENT DOCUMENTS

JP 2009-531009 A 6/2009
JP 2011-97657 A 5/2011

OTHER PUBLICATIONS

Written Opinion of the International Searching Authority for PCT/JP2013/073317, dated Oct. 29, 2013.

* cited by examiner

POWER RECEPTION DEVICE, POWER TRANSMISSION DEVICE, AND POWER TRANSMISSION SYSTEM

CROSS-REFERENCE TO RELATED APPLICATIONS

The present application is a continuation of PCT/JP2013/073317 filed Aug. 30, 2013, which claims priority to Japanese Patent Application No. 2013-008082, filed Jan. 21, 2013, the entire contents of each of which are incorporated herein by reference.

FIELD OF THE INVENTION

The present invention relates to power reception devices, power transmission devices, and power transmission systems, particularly to power reception devices, power transmission devices and power transmission systems based on an electric field coupling technique.

BACKGROUND OF THE INVENTION

An example of an apparatus configured to transmit power using an electric field coupling technique is disclosed in Patent Document 1. The stated apparatus is configured of an energy generation device and an energy consumption device that are located close to each other. Further, the apparatus can be expressed using a technical model in which asymmetric oscillation electric dipoles mutually influence each other and the dipole is configured of a high voltage high-frequency generator or high voltage high-frequency charge that is placed between two electrodes. These dipoles mutually influence each other. Electric energy and/or information is remotely transmitted making use of a Coulomb field that surrounds a set of any charged conductors in a variable state that gradually changes.

An example of an electronic apparatus configured to carry out wireless communication using a magnetic field coupling technique is disclosed in Patent Document 2. The stated electronic apparatus includes a loop or whirlpool-shaped coil conductor and a conductor layer having a conductor opening portion and a slit extended to the opening portion. Note that the center portion of a coil winding in the coil conductor is a coil opening portion. When the coil is viewed from above, the coil opening portion overlaps with the conductor opening portion, an area of the conductor layer is larger than an area of a region where the coil conductor is formed, and a magnetic sheet is provided so as to cover the coil opening portion and the conductor opening portion. This makes it possible to establish stable communication even if an antenna is made smaller than that of a communication counterpart.

Patent Document 1: Japanese Unexamined Patent Application Publication (Translation of PCT Application) No. 2009-531009

Patent Document 2: Japanese Unexamined Patent Application Publication No. 2011-97657

However, in order to realize the power transmission disclosed in Patent Document 1 and the wireless communication disclosed in Patent Document 2 with a single apparatus, transmission and reception antennas and power transmission and reception electrodes are both needed to be installed in a single apparatus. Here, in the case where size of the apparatus is limited, at least one of the power transmission and the wireless communication cannot satisfy its desired performance. Further, in the case where the transmission and reception antennas and the power transmission and reception electrodes are disposed close to each other, one side interferes with the other side so that the power transmission performance or the wireless communication performance is degraded.

SUMMARY OF THE INVENTION

As such, it is a primary object of the present invention to provide a power reception device, a power transmission device, and a power transmission system capable of enhancing both power transmission performance and wireless communication performance.

A power reception device (30: corresponding to a reference numeral used in embodiments; the same as above hereinafter) according to the present invention includes a feeding coil (40) for wireless communication, a short distance wireless communication circuit (42-43) that has a wireless IC chip (43) and a feeding circuit (42) and transmits/receives high frequency signals via the feeding coil, a first electrode (E21) that is electrically field-coupled with a power transmission device (10), a conductor member (E22, E22_1, E22_2) configured to function as a booster antenna that is magnetically field-coupled with the feeding coil when wireless communication with the power transmission device is carried out as well as function as a second electrode that is electrically field-coupled with the power transmission device in cooperation with the first electrode when power is received from the power transmission device, and a power supply circuit (34-38) configured to supply a load (46) with power in an AC voltage that is excited on the first electrode and the conductor member through electric field coupling.

It is preferable for the power supply circuit to include a step-down transformer (34) configured to step down an AC voltage excited on the first electrode and the conductor member and a rectification circuit (36) configured to rectify an AC voltage that has been stepped down by the step-down transformer.

It is preferable for the power reception device to further include a cutoff circuit (SW21-SW22, S5-S11) configured to cut off connection between the power supply circuit and at least one of the first electrode and the conductor member when wireless communication is carried out.

It is preferable for an area of the first electrode to be smaller than an area of the second electrode.

It is preferable for the power reception device to further include a power reception surface opposing the power transmission device, where the conductor member is provided to be in the same distance as the first electrode or to be farther distanced than the first electrode relative to the power reception surface, and the feeding coil is provided to be farther distanced than the conductor member relative to the power reception surface.

It is preferable for the conductor member to be so disposed as to surround the first electrode.

It is preferable that the feeding coil be a planar coil and a coil opening thereof be so disposed as to oppose the power reception surface, and that the power reception device further include a magnetic member (MG) which is provided on a surface of the feeding coil on the side farther from the power reception surface.

A power transmission device (10) according to the present invention includes a feeding coil (26) for wireless communication, a short distance wireless communication circuit (23-24) that has a wireless IC chip (23) and a feeding circuit (24) and transmits/receives high frequency signals via the feeding coil, a first electrode (E11) that is electrically field-coupled with a power reception device (30), a conductor member (E12_1, E12_2) configured to function as a booster antenna that is magnetically field-coupled with the feeding coil when wireless communication with the power reception device is carried out as well as function as a second electrode that is electrically field-coupled with the power reception device in cooperation with the first electrode when power is transmitted to the power reception device, and a step-up transformer (20) configured to supply the first electrode and the conductor member with an AC voltage outputted from an AC voltage source (18).

A power transmission system (100) according to the present invention is a power transmission system that includes a power transmission device (10) configured to transmit an AC voltage using an electric field coupling technique and a power reception device (30) configure to receive an AC voltage transmitted from the power transmission device using an electric field coupling technique, where the power reception device includes a feeding coil (40) for wireless communication, a short distance wireless communication circuit (42-43) that has a wireless IC chip (43) and a feeding circuit (42) and transmits/receives high frequency signals via the feeding coil, a first electrode (E21) that is electrically field-coupled with the power transmission device (10), a conductor member (E22, E22_1, E22_2) configured to function as a booster antenna that is magnetically field-coupled with the feeding coil when wireless communication with the power transmission device is carried out as well as function as a second electrode that is electrically field-coupled with the power transmission device in cooperation with the first electrode when power is received from the power transmission device, and a power supply circuit (34-38) configured to supply a load (46) with power in an AC voltage that is excited on the first electrode and the conductor member through electric field coupling.

A power transmission system (100) according to the present invention is a power transmission system that includes a power transmission device (10) configured to transmit an AC voltage using an electric field coupling technique and a power reception device (30) configure to receive an AC voltage transmitted from the power transmission device using an electric field coupling technique, where the power transmission device includes a feeding coil (26) for wireless communication, a short distance wireless communication circuit (23-24) that has a wireless IC chip (23) and a feeding circuit (24) and transmits/receives high frequency signals via the feeding coil, a first electrode (E11) that is electrically field-coupled with the power reception device (30), a conductor member (E12_1, E12_2) configured to function as a booster antenna that is magnetically field-coupled with the feeding coil when wireless communication with the power reception device is carried out as well as function as a second electrode that is electrically field-coupled with the power reception device in cooperation with the first electrode when power is transmitted to the power reception device, and a step-up transformer (20) configured to supply the first electrode and the conductor member with an AC voltage outputted from an AC voltage source (18).

According to the present invention, when the power being received, the conductor member functions as a second electrode for electric field coupling. Electric field coupling with the power transmission device is realized by the first electrode and the conductor member, and the power in an AC voltage excited on the first electrode and the conductor member is supplied to the load by the power supply circuit.

When the wireless communication being carried out, the conductor member functions as a booster antenna. A high frequency signal received from the power transmission device is inputted, via the booster antenna and the feeding coil, to the short distance wireless communication circuit, while a high frequency signal outputted from the short distance wireless communication circuit is transmitted, via the feeding coil and the booster antenna, to the power transmission device.

Through this, the conductor member can be shared in use as an electrode for electric field coupling and an antenna for wireless communication. This makes it possible to enhance both power transmission performance and wireless communication performance even in a miniaturized device.

According to the present invention, when the power being transmitted, the conductor member functions as a second electrode for electric field coupling. Electric field coupling with the power reception device is realized by the first electrode and the conductor member, and an AC voltage outputted from the AC voltage source is supplied to the first electrode and the conductor member by the power supply circuit.

When the wireless communication being carried out, the conductor member functions as a booster antenna. A high frequency signal outputted from the short distance wireless communication circuit is transmitted, via the feeding coil and the booster antenna, to the power reception device, while a high frequency signal received from the power reception device is inputted, via the booster antenna and the feeding coil, to the short distance wireless communication circuit.

Through this, the conductor member can be shared in use as an electrode for electric field coupling and an antenna for wireless communication. This makes it possible to enhance both power transmission performance and wireless communication performance even in a miniaturized device.

The above-mentioned object of the present invention, other objects, features, and advantages thereof will be further clarified from embodiments described in detail hereinafter with reference to drawings.

DETAILED DESCRIPTION OF THE EXEMPLARY EMBODIMENTS

Figure 1:
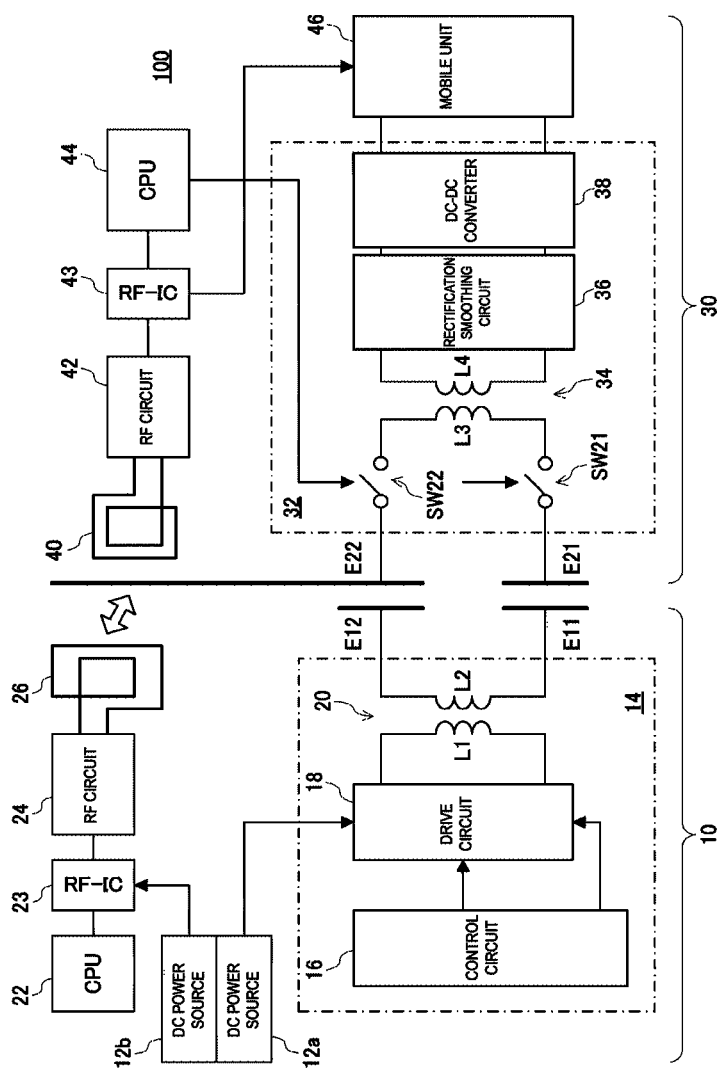
FIG. 1 is a block diagram illustrating a configuration of a power transmission system according to an embodiment of the present invention.

As shown in FIG. 1, a power transmission system 100 according to an embodiment of the present invention includes a power transmission device 10 configured to transmit a high frequency voltage at a frequency of 100 kHz to 10 MHz using an electric field coupling technique and a power reception device 30 configured to receive the high frequency voltage transmitted from the power transmission device 10 using an electric field coupling technique. Further, the power transmission device 10 and the power reception device 30 each have a wireless communication function by which a 13.56 MHz high frequency signal is communicated.

In the power transmission device 10, a high frequency voltage to be transmitted is generated by a power transmission circuit 14, and high frequency signals are inputted/outputted by an RF-IC 23 and an RF circuit (feeding circuit) 24 under the control of a CPU 22. The RF-IC 23 is driven by a DC power source 12b. Further, in the power reception device 30, the received high frequency voltage is converted to a DC voltage by a power reception circuit 32, and high frequency signals are inputted/outputted by an RF-IC 43 and an RF circuit (feeding circuit) 42 under the control of a CPU 44.

A control circuit 16 provided in the power transmission circuit 14 supplies a drive circuit 18 with a PWM signal at a frequency of 100 kHz to 10 MHz. The drive circuit 18 converts a DC voltage supplied from a DC power source 12a to a high frequency voltage in accordance with the PWM signal supplied from the control circuit 16. A frequency of the converted high frequency voltage is the same as that of the PWM signal, and a level of the converted high frequency voltage depends on a duty ratio of the PWM signal.

The converted high frequency voltage is applied to a primary winding L1 forming a step-up transformer 20. A high frequency voltage that is stepped up to a different voltage in accordance with a ratio of transformation is excited on a secondary winding L2 also forming the step-up transformer 20. One end and the other end of the secondary winding L2 are connected to an active electrode (small electrode) E11 and a passive electrode (large electrode) E12 for electric field coupling, respectively. Accordingly, the high frequency voltage stepped up by the step-up transformer 20 is applied to the active electrode E11 and the passive electrode E12.

An active electrode E21 and a passive electrode E22 for electric field coupling are provided in the power reception device 30. The active electrode E21 is connected to one end of a primary winding L3 via a switch SW21 provided in the power reception circuit 32, and the passive electrode E22 is connected to the other end of the primary winding L3 via a switch SW22 provided in the power reception circuit 32.

The primary winding L3, along with a secondary winding L4, forms a step-down transformer 34. The switches SW21 and SW22 are turned on by the CPU 44 during a period of time excluding the time when wireless communication is carried out. Accordingly, when a high frequency voltage is excited on the active electrode E21 and the passive electrode E22 through electric field coupling with the active electrode E11 and the passive electrode E12 provided in the power transmission device 10, a high frequency voltage is also excited on the secondary coil L4 representing a voltage level in accordance with a ratio of step-down transformation of the step-down transformer 34.

A rectification smoothing circuit 36 is so configured as to rectify and smooth a high frequency voltage excited on the secondary coil L4. A DC-DC converter 38 adjusts a level of a DC voltage created in the above operation and supplies a DC voltage at the adjusted level to a mobile unit 46.

The RF-IC 23 provided in the power transmission device 10 supplies a baseband signal to the RF circuit 24 when wireless communication with the power reception device 30 is carried out. The RF circuit 24 modulates the supplied baseband signal into a high frequency signal and transmits the modulated high frequency signal through a large antenna coil (feeding coil) 26. Meanwhile, the CPU 44 provided in the power reception device 30 turns off the switches SW21 and SW22 when wireless communication with the power transmission device 10 is carried out. This makes the passive electrode E22 function as a booster antenna that is magnetically field-coupled with a small antenna coil (feeding coil) 40.

The high frequency signal transmitted from the power transmission device 10 is inputted, via the passive electrode E22 and the antenna coil 40, to the RF circuit 42. The RF circuit 42 demodulates the inputted high frequency signal into the baseband signal and supplies the demodulated baseband signal to the RF-IC 43.

The baseband signal outputted from the RF-IC 43 is modulated into a high frequency signal by the RF circuit 42, and the modulated high frequency signal is transmitted via the antenna coil 40 and the passive electrode 22. The transmitted high frequency signal is inputted, via the antenna coil 26 of the power transmission device 10, to the RF circuit 24 and demodulated into the baseband signal. The demodulated baseband signal is supplied to the RF-IC 23.

Figure 2:
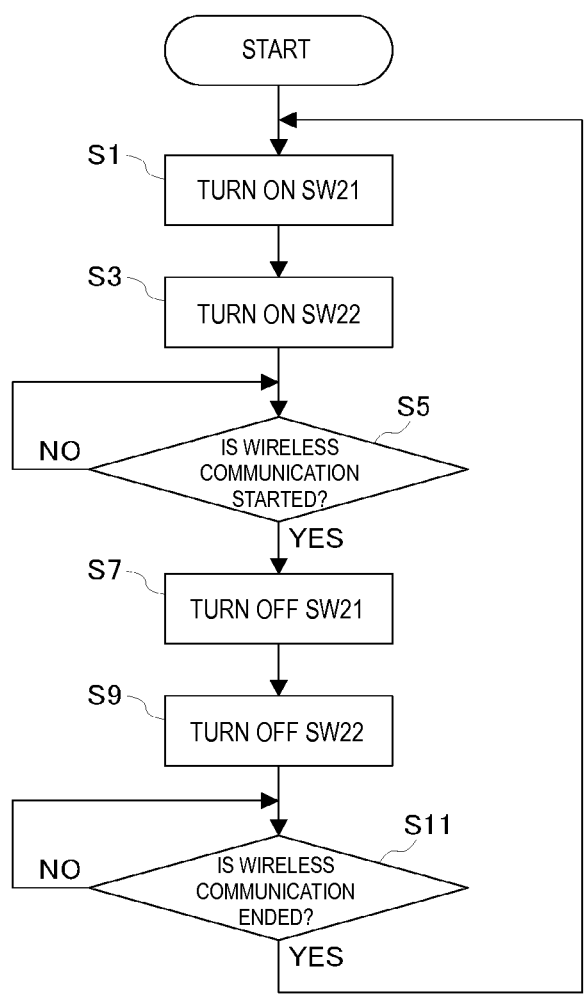
FIG. 2 is a flow chart illustrating part of operations of a CPU provided in a power reception device shown in FIG. 1.

Regarding turn-on/off control on the switches SW21 and SW22, the CPU 44 executes operations in accordance with a flow chart shown in FIG. 2. First, the switch SW21 is turned on in step S1 and the switch SW22 is turned on in step S3. In step S5, it is repeatedly determined whether or not wireless communication is started. If the determination result changes from "NO" to "YES", the switch SW21 is turned off in step S7 and the switch SW22 is turned off in step S9. In step S11, it is repeatedly determined whether or not the wireless communication is ended, and the processing returns to step S1 if the determination result changes from "NO" to "YES".

Here, the execution order of steps S1 and S3 may be reversed or both the steps may be executed simultaneously. Likewise, the execution order of steps S7 and S9 may be reversed or both the steps may be executed simultaneously.

Figure 3:
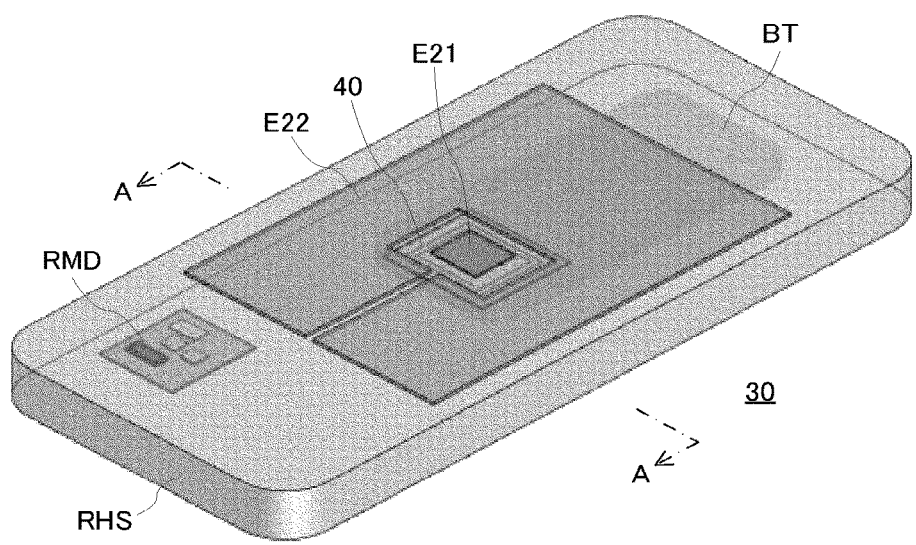
FIG. 3 is a perspective view illustrating an example of an external appearance of the power reception device shown in FIG. 1.
Figure 4:
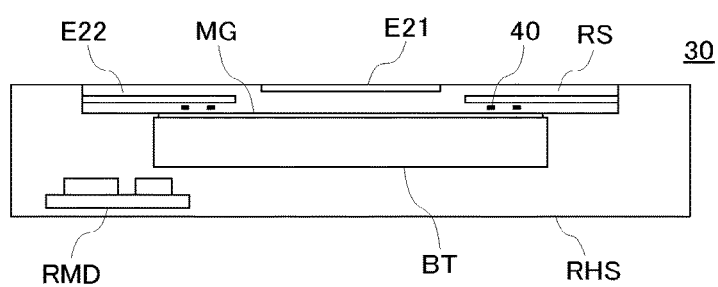
FIG. 4 is a cross-sectional view of the power reception device shown in FIG. 3 taken along the line A-A in the drawing.

As shown in FIGS. 3 and 4, the power reception device 30 includes a housing RHS formed in a plate or parallelepiped shape in which one principal surface and the other principal surface thereof are respectively rectangular. The housing RHS holds a battery BT and a power reception module RMD in which the power reception circuit 32, the RF circuit 42, the RF-IC 43, and the CPU 44 are mounted. Note that the one principal surface of the housing RHS corresponds to the upper surface thereof, and the other principal surface of the housing RHS corresponds to the lower surface thereof.

Figure 5A:
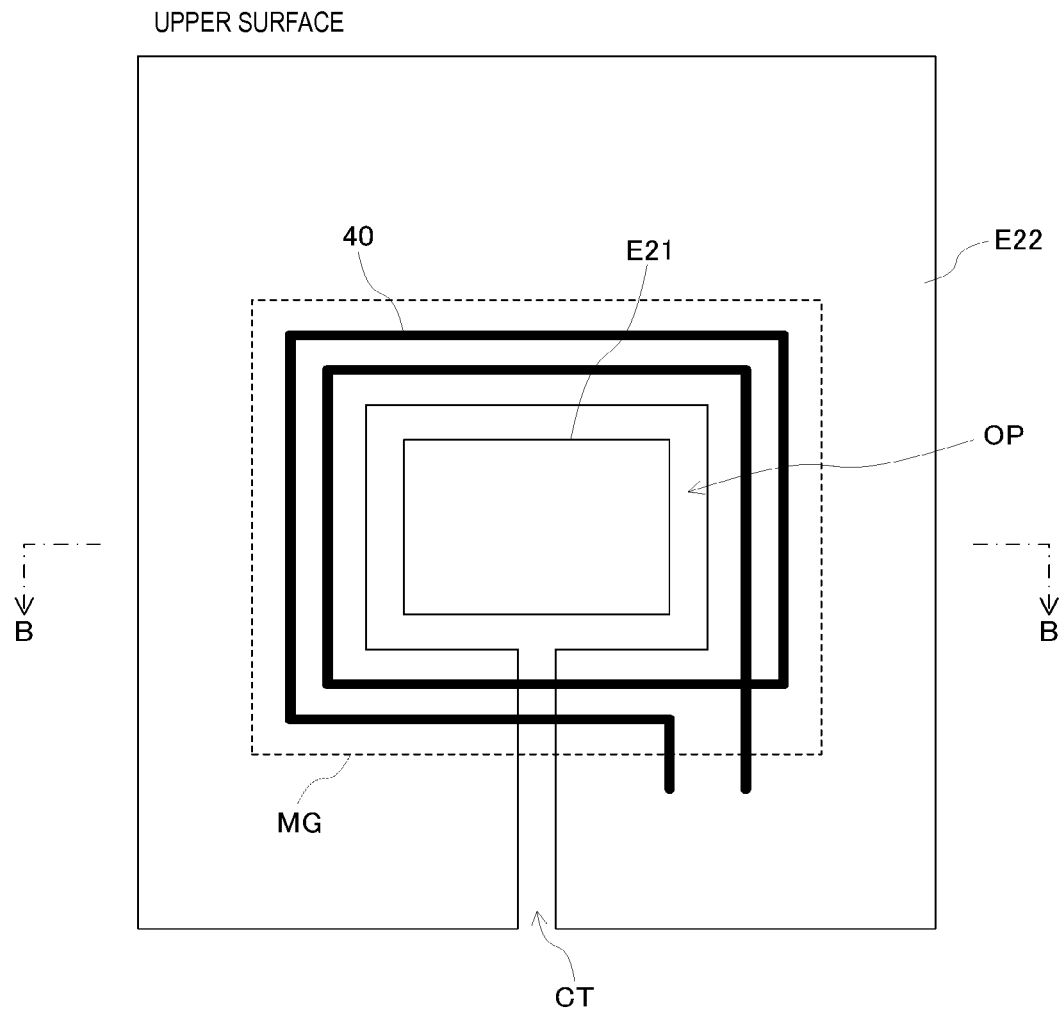
FIG. 5(A) is a descriptive diagram illustrating an example of a laminated structure of an active electrode, a passive electrode, an antenna coil, and a magnetic sheet that are installed in the power reception device shown in FIG. 3.
Figure 5B:
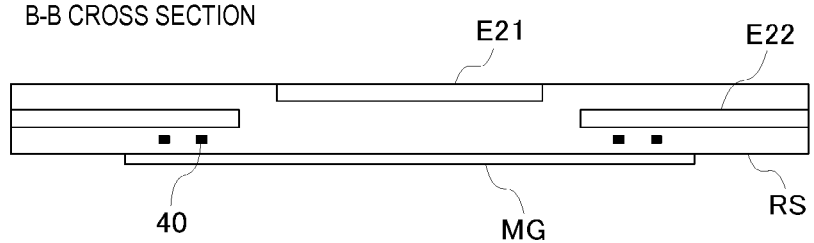
FIG. 5(B) is a cross-sectional view of the laminated structure shown in FIG. 5(A) taken along the line B-B in the drawing.

Further, as shown in FIGS. 5(A) and 5(B), both the active electrode E21 and the passive electrode E22 are formed in a plate shape. In addition, thickness of the active electrode E21 is the same as that of the passive electrode E22. However, when an area of a principal surface of the active electrode E21 and an area of a principal surface of the passive electrode E22 are compared with each other, the area of the principal surface of the passive electrode E22 is significantly larger than the area of the principal surface of the active electrode E21. Further, at the center of the principal surface of the passive electrode E22, there is formed a rectangular opening OP which is larger than the principal surface of the active electrode E21. Furthermore, a belt-like cutout CT that is so extended from the opening OP as to reach an outer edge of the passive electrode E22 is formed in the passive electrode E22.

The direction of one principal surface of the active electrode E21 is the same as the direction of one principal surface of the passive electrode E22, and the direction of the other principal surface of the active electrode E21 is the same as the direction of the other principal surface of the passive electrode E22. Here, the one principal surface of each of the active electrode E21 and the passive electrode E22 corresponds to the upper surface thereof, and the other principal surface of each of the active electrode E21 and the passive electrode E22 corresponds to the lower surface thereof. When viewed from above, the active electrode E21 is held inside the opening OP with a posture such that the longer sides forming the principal surface of the active electrode E21 extend in parallel to the longer sides forming a principal surface of the opening OP.

The antenna coil 40 is so formed as to draw a spiral centered to an axis extending in a vertical direction at the center of the opening OP. The spiral is drawn at an outer side portion of the opening OP, and an opening that appears when the spiral is viewed from above is larger than the opening OP.

The active electrode E21, the passive electrode E22, and the antenna coil 40 respectively having the above-described sizes and shapes are formed in one principal surface (=upper surface) of and at the inside of a transparent sheet RS made of resin. To be more specific, the active electrode E21 is formed in the one principal surface of the transparent sheet RS, while the passive electrode E22 and the antenna coil 40 are formed at the inside of the transparent sheet RS. The antenna coil 40 is formed on the lower side of the passive electrode E22 in a thickness direction of the transparent sheet (=vertical direction). In other words, the passive electrode E22 is provided at a lower position than the active electrode E21, and the antenna coil 40 is provided at a lower position than the passive electrode E22. Note that the passive electrode E22 and the active electrode E21 may be provided at the same height.

A magnetic sheet MG is bonded to the transparent sheet RS so that one principal surface (=upper surface) of the magnetic sheet MG makes contact with the other principal surface (=lower surface) of the transparent sheet RS. An area of the principal surface of the magnetic sheet MG is smaller than the area of the principal surface of the passive electrode E22, but larger than the area of the opening OP. Accordingly, the antenna coil 40 is covered with the magnetic sheet MG when viewed from below. Returning to FIGS. 3 and 4, the transparent sheet RS and the magnetic sheet MG are held in the housing RHS so that the one principal surface of the transparent sheet RS makes contact with a rear side of the one principal surface of the housing RHS.

As can be understood from the above descriptions, the passive electrode E22 for electric field coupling is released by the switch SW22 being turned off when wireless communication is carried out and functions as a booster antenna that is magnetically field-coupled with the antenna coil 40. This ensures high wireless communication performance even in a miniaturized device.

In the present embodiment, the switch SW21 is provided between the active electrode E21 and the one end of the primary coil L3, and the switch SW22 is provided between the passive electrode E22 and the other end of the primary coil L3. Note that, however, the switch SW21 may be omitted and the active electrode E21 may be directly connected to the one end of the primary coil L3. Alternatively, the switch SW22 may be omitted and the passive electrode E22 may be directly connected to the other end of the primary coil L3. Moreover, both the switches SW21 and SW22 may be omitted.

Figure 6:
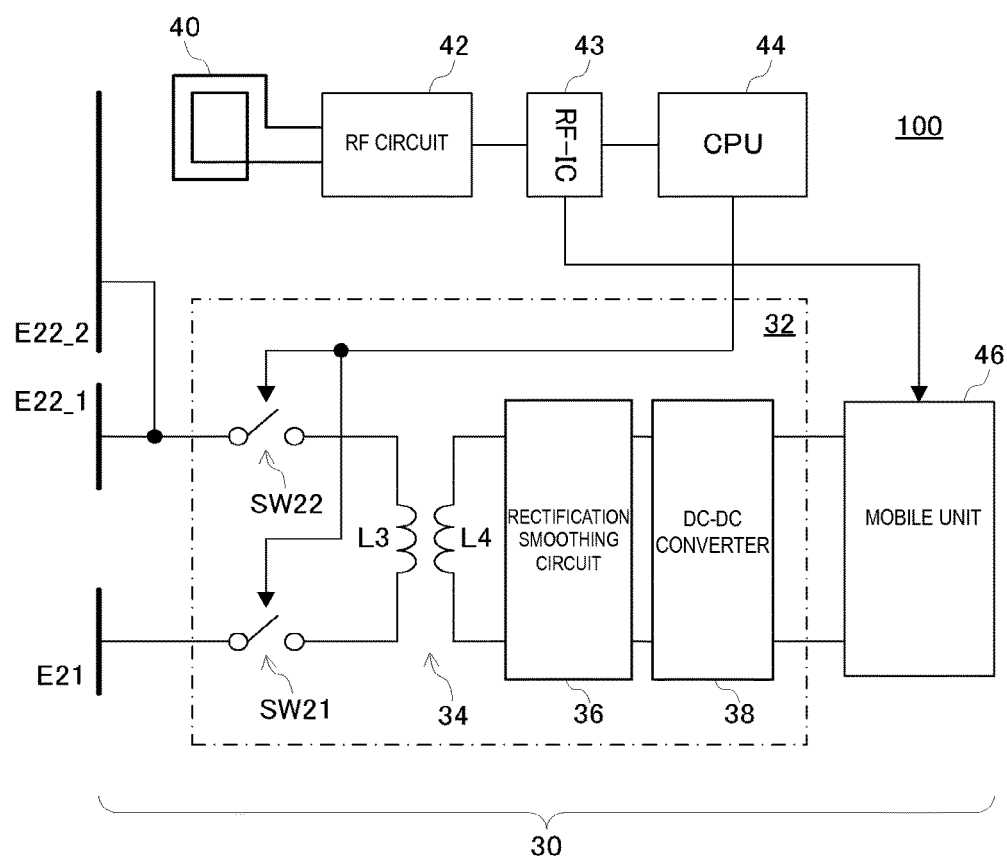
FIG. 6 is a block diagram illustrating a configuration of a power reception device that is applied to a power transmission system according to another embodiment.

As shown in FIG. 6, a power transmission system 100 according to another embodiment is the same as the power transmission system of the embodiment having been discussed using FIG. 1 through FIG. 5 aside from that some of the constituent elements of a power reception device 30 in FIG. 6 are different from those of the power reception device 30 shown in FIG. 1. As such, redundant descriptions on the same constituent elements will be omitted.

Figure 7:
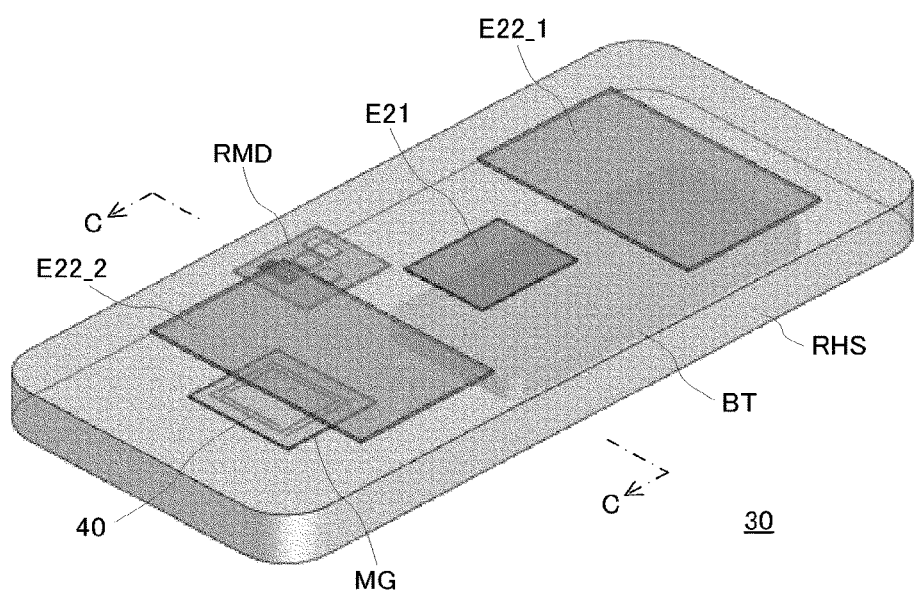
FIG. 7 is a perspective view illustrating an example of an external appearance of the power reception device shown in FIG. 6.
Figure 8:
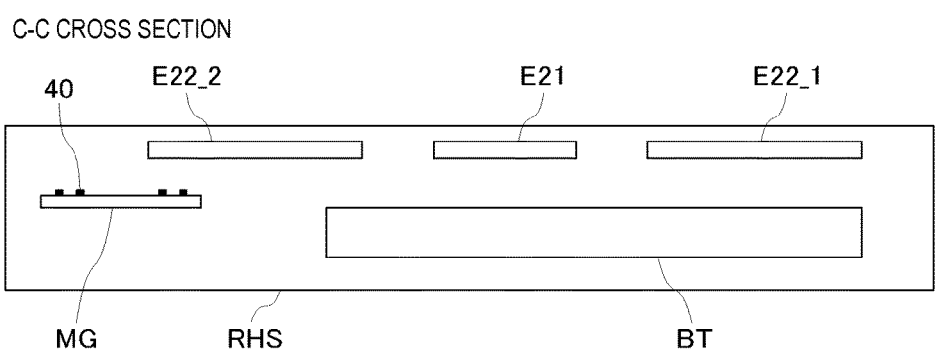
FIG. 8 is a cross-sectional view of the power reception device shown in FIG. 7 taken along the line C-C in the drawing.
Figure 9:
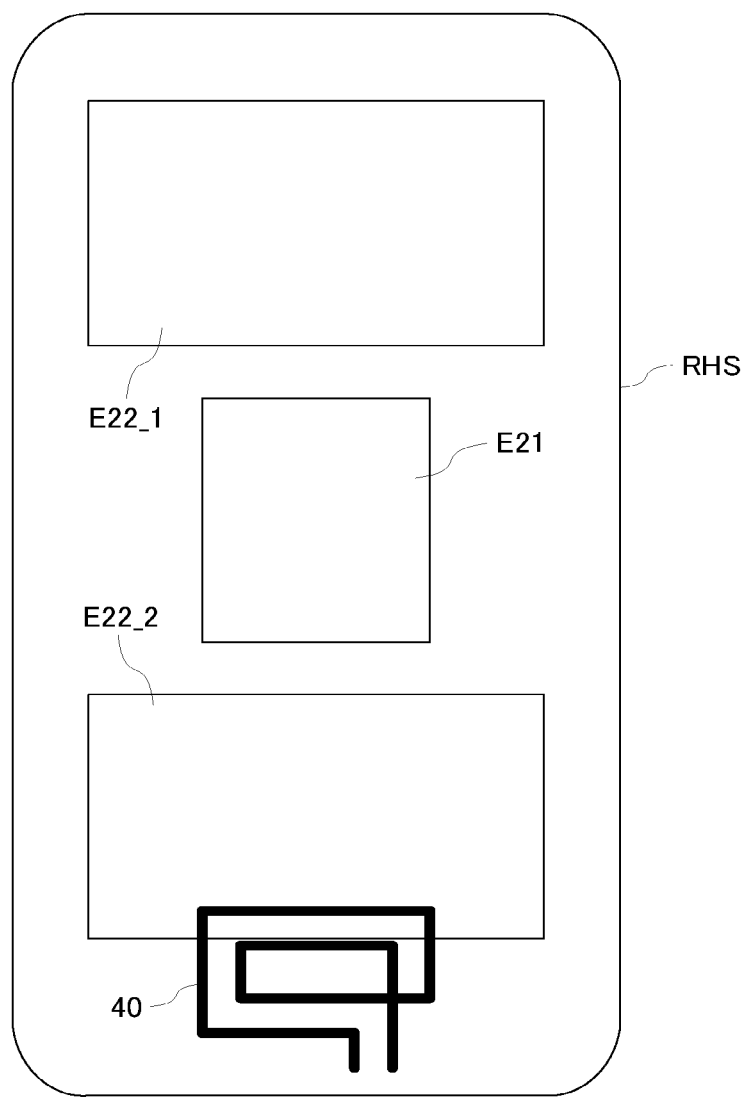
FIG. 9 is a descriptive diagram illustrating a positional relationship among an active electrode, a passive electrode, and an antenna coil that are installed in the power reception device shown in FIG. 7.

According to FIG. 6, passive electrodes E22_1 and E22_2 are provided in place of the passive electrode E22, and the switch SW22 is commonly connected to the passive electrodes E22_1 and E22_2. As shown in FIGS. 7 through 9, the active electrode E21 is provided at the center of the one principal surface of the housing RHS. Meanwhile, the passive electrodes E22_1 and E22_2 are so provided in the one principal surface of the housing RHS as to sandwich the active electrode E21 in a direction along the longer sides of a rectangle that forms the one principal surface of the housing RHS. Here, the active electrode E21 and the passive electrodes E22_1, E22_2 are held in the housing RHS so that the respective one principal surfaces thereof are bonded to the rear side of the one principal surface of the housing RHS.

The antenna coil 40 is so formed on the principal surface (=upper surface) of the magnetic sheet MG as to draw a spiral centered to the center of the principal surface of the magnetic sheet MG. The antenna coil 40 and the magnetic sheet MG are held in the housing RHS so that the direction of the one principal surface of the magnetic sheet MG is the same as that of the one principal surface of the housing RHS and a part of the antenna coil 40 overlaps with the passive electrode E22_2 when viewed from above. Because the one principal surface of the passive electrode E22_2 is bonded to the rear side of the one principal surface of the housing RHS, the antenna coil 40 is disposed at a lower position than the passive electrode E22_2.

Also in this embodiment, the passive electrodes E22_1 and E22_2 for electric field coupling are released by the switch SW22 being turned off when wireless communication is carried out. Further, the passive electrode E22_2 functions as a booster antenna that is magnetically field-coupled with the antenna coil 40 when wireless communication is carried out. This ensures high wireless communication performance even in a miniaturized device.

In the embodiment shown in FIGS. 6 through 9, the active electrode E21 and the passive electrodes E22_1 and E22_2 are bonded to the rear side of the one principal surface of the housing RHS; the power reception module RMD in which the power reception circuit 32, the RF circuit 42, and the CPU 44 are mounted, and the antenna coil 40 formed on the magnetic sheet MG are held in the housing RHS.

Figure 10:
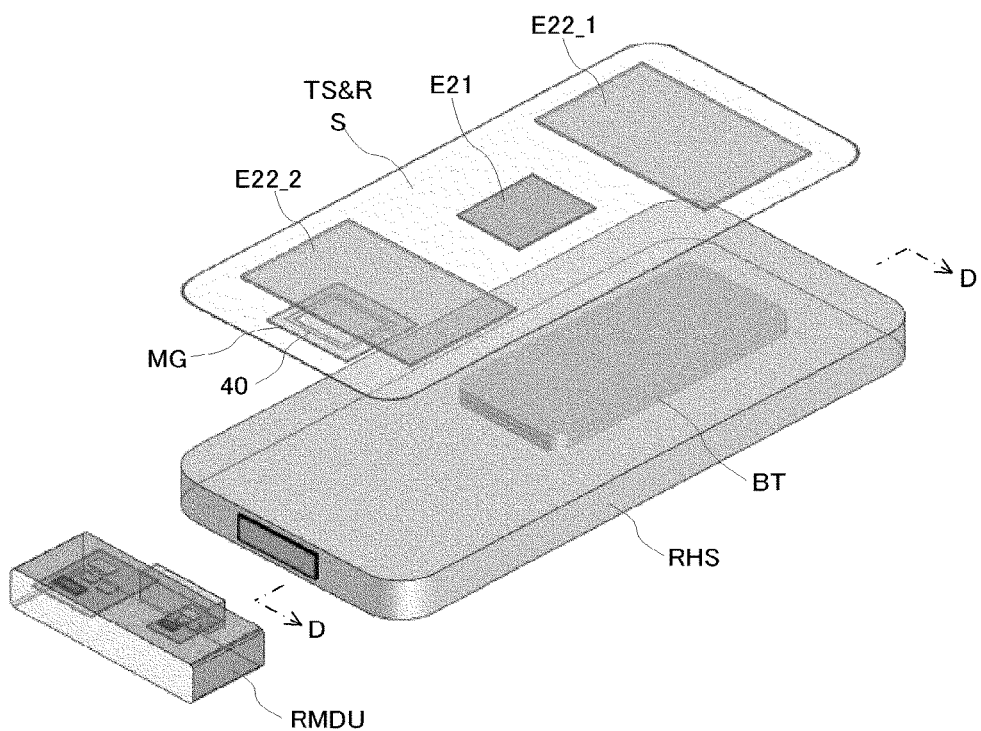
FIG. 10 is an exploded perspective view illustrating an example of an external appearance of a power reception device that is applied to a power transmission system according to still another embodiment.
Figure 11:
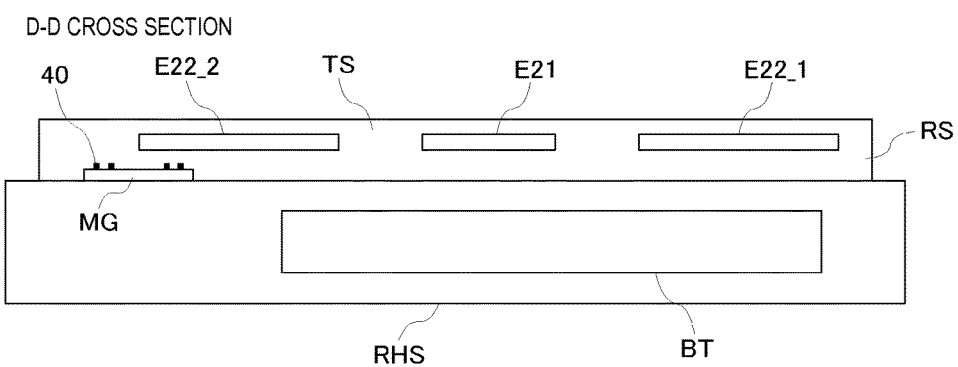
FIG. 11 is a cross-sectional view of the power reception device shown in FIG. 10 taken along the line D-D in the drawing.

However, as shown in FIGS. 10 and 11, it is advisable that an electrode sheet RS made of resin in which the active electrode E21, the passive electrodes E22_1 and E22_2, the antenna coil 40, and the magnetic sheet MG are formed be manufactured, and an external power reception module unit RMDU in which the power reception circuit 32, the RF circuit 42, and the RF-IC 43 are mounted be manufactured. Then, the electrode sheet RS may be bonded to the one principal surface of the housing RHS, and the power reception module unit RMDU may be attached to the housing RHS in a detachable manner.

Figure 12:
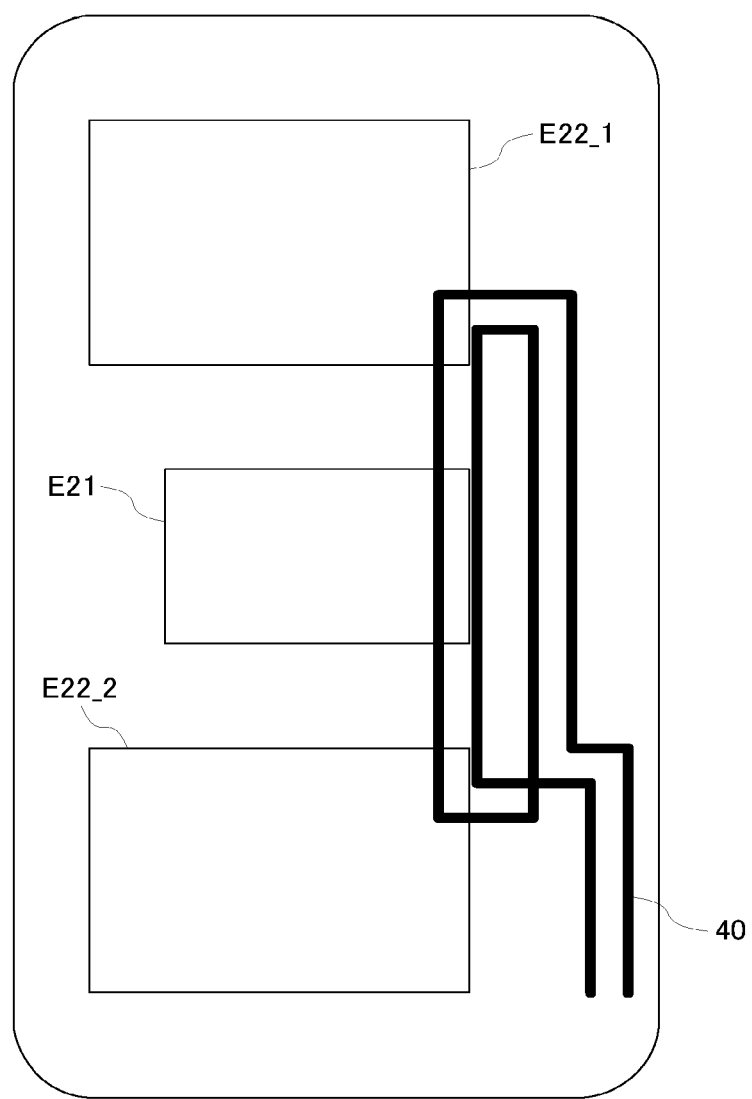
FIG. 12 is a descriptive diagram illustrating a positional relationship among an active electrode, a passive electrode, and an antenna coil that are installed in the power reception device shown in FIG. 10.

Further, in the embodiment shown in FIGS. 6 through 9, the antenna coil 40 is held in the housing RHS so that a part of the antenna coil 40 overlaps with the passive electrode E22_2 when viewed from above the housing RHS. However, the antenna coil 40 may be held in the housing RHS so that a part of the antenna coil 40 overlaps with both the passive electrode E22_1 and the passive electrode E22_2 when viewed from above the housing RHS. In addition, a part of the antenna coil 40 may further overlap with the active electrode E21. In this case, the antenna coil 40 is formed or disposed in a state as illustrated in FIG. 12.

Figure 13:
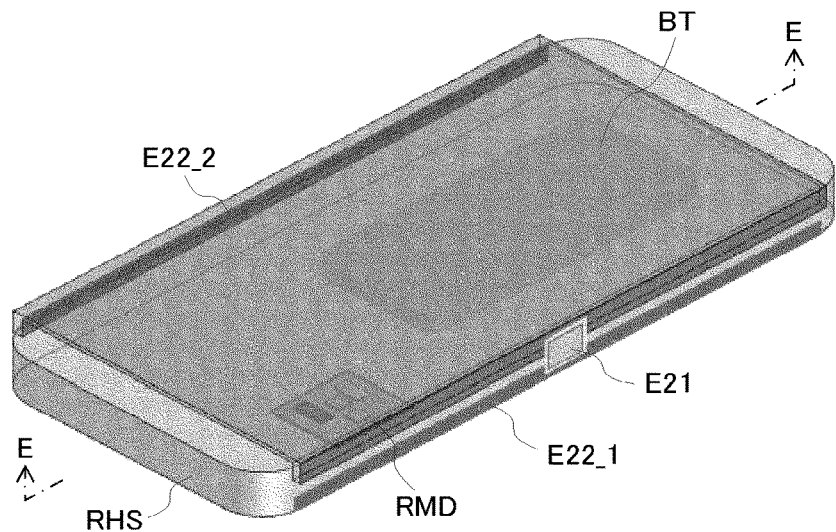
FIG. 13 is a perspective view illustrating an example of an external appearance of a power reception device that is applied to a power transmission system according to further still another embodiment.
Figure 14A:
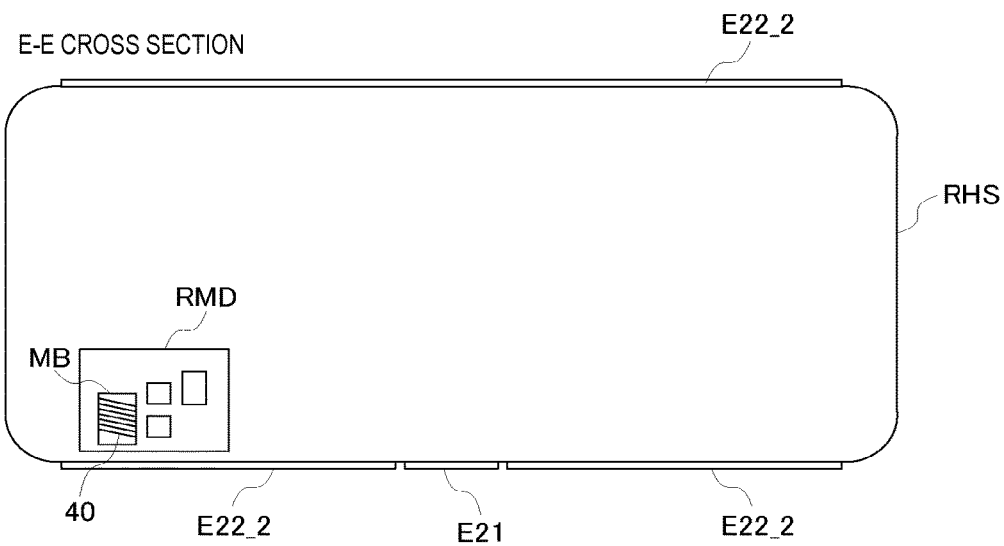
FIG. 14(A) is a cross-sectional view of the power reception device shown in FIG. 13 taken along the line E-E in the drawing.
Figure 14B:
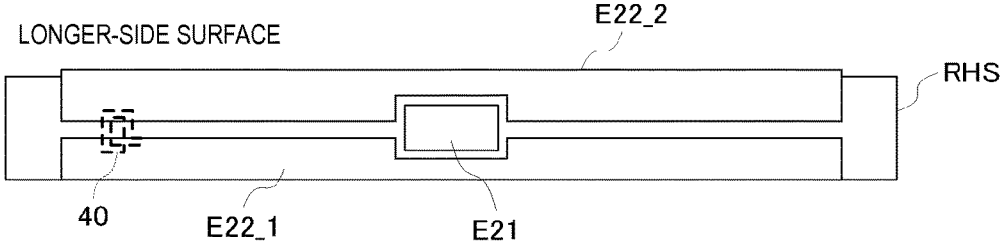
FIG. 14(B) is a longer-side surface view of the power reception device shown in FIG. 13.

Furthermore, in the embodiment as shown in FIGS. 6 through 9, the active electrode E21 and the passive electrodes E22_1 and E22_2 are provided at the rear side of the one principal surface of the housing RHS. However, as shown in FIG. 13, the active electrode E21 may be provided at the center of one longer-side surface of the housing RHS, the passive electrode E22_1 may be provided in an area extending from the other principal surface of the housing RHS to the one longer-side surface and the other longer-side surface thereof, and the passive electrode E22_2 may be provided in an area extending from the one principal surface of the housing RHS to the one longer-side surface and the other longer-side surface thereof. At this time, the antenna coil 40 is wound around a magnetic member MB and mounted in the power reception module RMD so that the winding axis is orthogonal to the longer-side surface of the housing RHS. Further, a part of the antenna coil 40 overlaps with both the passive electrode E22_1 and passive electrode E22_2 when viewed from above the one longer-side surface of the housing RHS (see FIGS. 14(A) and 14(B)).

Figure 15:
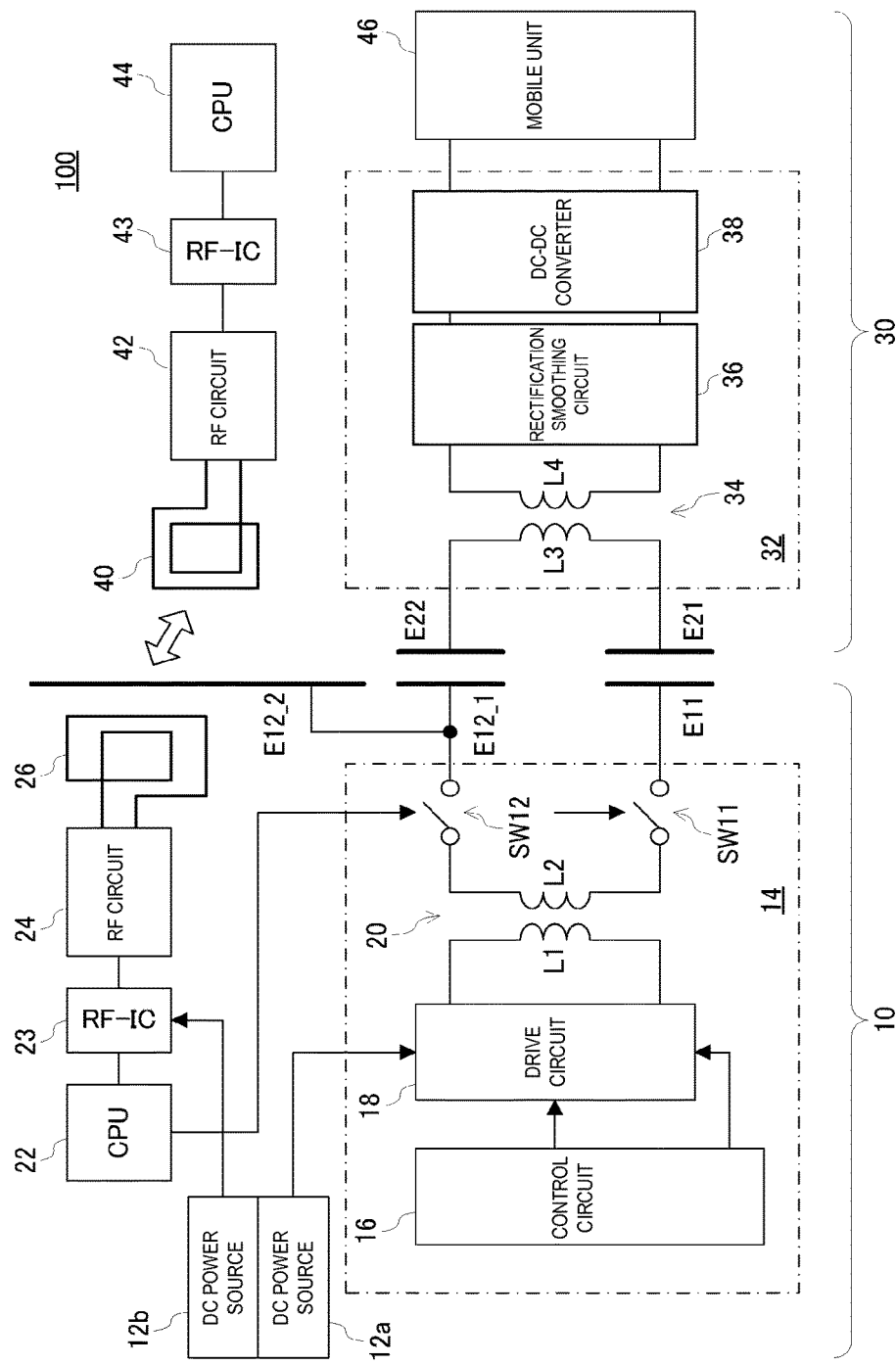
FIG. 15 is a block diagram illustrating a configuration of a power transmission system according to another embodiment.

As shown in FIG. 15, a power transmission system 100 according to another embodiment includes the same constituent elements as the power transmission system 100 shown in FIG. 1. As such, those same constituent elements will be given the same reference numerals. Note that in this embodiment, the antenna coil 40 is larger than the antenna coil 26.

The power transmission system 100 includes the power transmission device 10 configured to transmit a high frequency voltage at a frequency of 100 kHz to 10 MHz using an electric field coupling technique and the power reception device 30 configured to receive a high frequency voltage transmitted from the power transmission device 10 using an electric field coupling technique. In addition, the power transmission device 10 and the power reception device 30 each have a wireless communication function by which a 13.56 MHz high frequency signal is communicated.

Also in the power transmission device 10, a high frequency voltage to be transmitted is generated by the power transmission circuit 14, and high frequency signals are inputted/outputted by the RF-IC 23 and the RF circuit 24 under the control of the CPU 22. In the power reception device 30, the received high frequency voltage is converted to a DC voltage by the power reception circuit 32, and high frequency signals are inputted/outputted by the RF-IC 43 and the RF circuit 42 under the control of the CPU 44.

The control circuit 16 provided in the power transmission circuit 14 supplies the drive circuit 18 with a PWM signal at a frequency of 100 kHz to 10 MHz. The drive circuit 18 converts a DC voltage supplied from the DC power source 12 to a high frequency voltage in accordance with the PWM signal supplied from the control circuit 16. A frequency of the converted high frequency voltage is the same as that of the PWM signal, and a level of the converted high frequency voltage depends on a duty ratio of the PWM signal.

The converted high frequency voltage is applied to the primary winding L1 forming the step-up transformer 20. A high frequency voltage that is stepped up to a different voltage in accordance with a ratio of transformation is excited on the secondary winding L2 also forming the step-up transformer 20. One end of the secondary winding L2 is connected to the active electrode (small electrode) E11 for electric field coupling via a switch SW11, while the other end of the secondary winding L2 is connected to passive electrodes (large electrode) E12_1 and E12_2 via a switch SW12.

The switches SW11 and SW12 are turned on by the CPU 22 during a period of time excluding the time when wireless communication is carried out. Accordingly, a high frequency voltage having been stepped up by the step-up transformer 20 for power transmission is applied to the active electrode E11 via the switch SW11 and the passive electrodes E12_1, E12_2 via the switch SW12.

The active electrode E21 and the passive electrode E22 for electric field coupling are provided in the power reception device 30. The active electrode E21 is connected to the one end of the primary winding L3, and the passive electrode E22 is connected to the other end of the primary winding L3. The primary winding L3, along with the secondary winding L4, forms the step-down transformer 34.

Accordingly, when a high frequency voltage is excited on the active electrode E21 and the passive electrode E22 through electric field coupling with the active electrode E11 and the passive electrode E12 provided in the power transmission device 10, a high frequency voltage is also excited on the second coil L4 representing a voltage level in accordance with a ratio of step-down transformation of the step-down transformer 34.

The rectification smoothing circuit 36 is so configured as to rectify and smooth the high frequency voltage excited on the secondary coil L4. The DC-DC converter 38 adjusts a level of a DC voltage created in the above operation and supplies a DC voltage at the adjusted level to the mobile unit 46.

The CPU 22 provided in the power transmission device 10 turns off the switches SW11 and SW12 when wireless communication with the power reception device 30 is carried out. This makes the passive electrode E12_2 function as a booster antenna that is magnetically field-coupled with the antenna coil 26.

The RF-IC 23 supplies a baseband signal to the RF circuit 24 so as to carry out wireless communication with the power reception device 30. The RF circuit 24 modulates the supplied baseband signal into a high frequency signal and transmits the modulated high frequency signal through the antenna coil 26 and the passive electrode E12_2.

The transmitted high frequency signal is inputted, via the antenna coil 40 provided in the power reception device 30, to the RF circuit 42. The RF circuit 42 demodulates the inputted high frequency signal into the baseband signal and supplies the demodulated baseband signal to the RF-IC 43. A baseband signal outputted from the RF-IC 43 is modulated into a high frequency signal by the RF circuit 42, and the modulated high frequency signal is transmitted via the antenna coil 40. The transmitted high frequency signal is inputted, via the antenna coil 26 of the power transmission device 10, to the RF circuit 24 and demodulated into the baseband signal. The demodulated baseband signal is supplied to the RF-IC 23.

Figure 16:
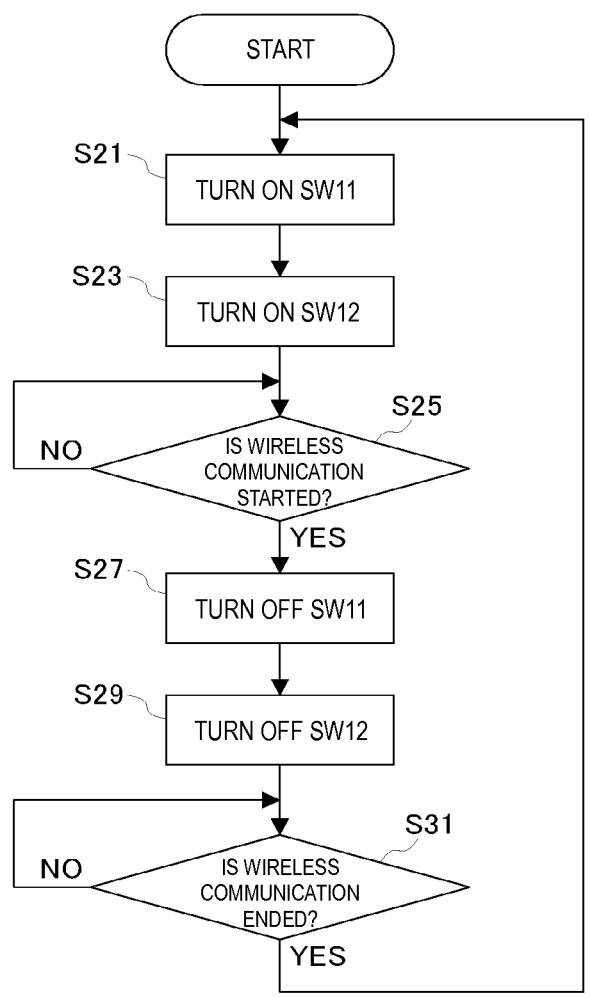
FIG. 16 is a flow chart illustrating part of operations of a CPU provided in a power transmission device shown in FIG. 15.

Regarding turn-on/off control on the switches SW11 and SW12, the CPU 22 executes operations in accordance with a flow chart shown in FIG. 16. First, the switch SW11 is turned on in step S21 and the switch SW12 is turned on in step S23. In step S25, it is repeatedly determined whether or not wireless communication is started. If the determination result changes from "NO" to "YES", the switch SW11 is turned off in step S27 and the switch SW12 is turned off in step S29. In step S31, it is repeatedly determined whether or not the wireless communication is ended, and the processing returns to step S21 if the determination result changes from "NO" to "YES".

Here, the execution order of steps S21 and S23 may be reversed or both the steps may be executed simultaneously. Likewise, the execution order of steps S27 and S29 may be reversed or both the steps may be executed simultaneously.

Figure 17:
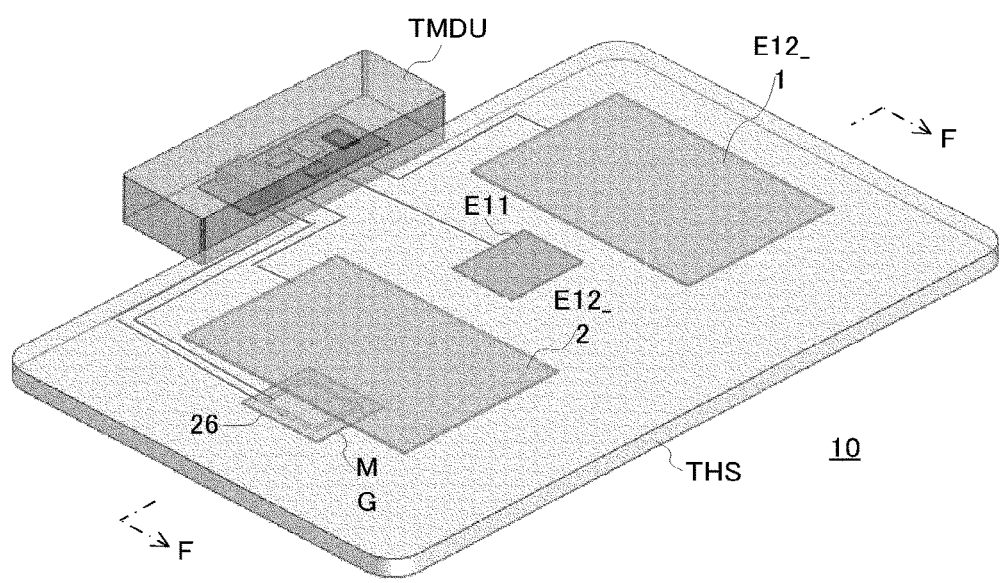
FIG. 17 is a perspective view illustrating an example of an external appearance of the power transmission device shown in FIG. 15.
Figure 18:
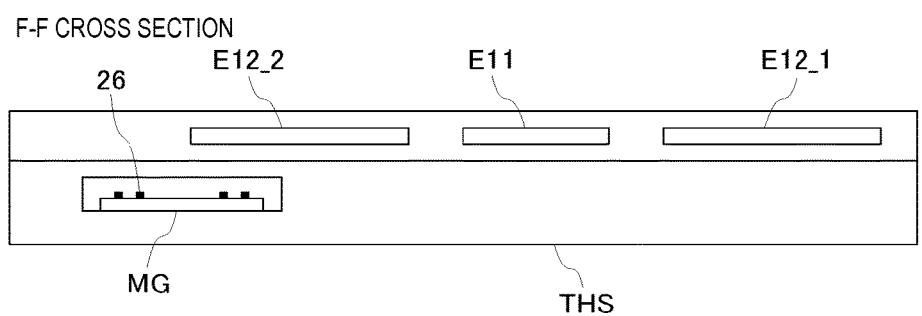
FIG. 18 is a cross-sectional view of the power transmission device shown in FIG. 17 taken along the line F-F in the drawing.

As shown in FIGS. 17 and 18, the power transmission device 10 includes a housing THS formed in a plate or parallelepiped shape in which one principal surface and the other principal surface thereof are respectively rectangular. A power transmission module unit TMDU in which the power transmission circuit 14, the CPU 22, the RF-IC 23, and the RF circuit 24 are mounted is attached to the housing THS in a detachable manner. Note that the one principal surface of the housing THS corresponds to the upper surface thereof, and the other principal surface of the housing THS corresponds to the lower surface thereof.

The active electrode E11 and the passive electrodes E12_1 and E12_2 are all formed in plate shapes and have the same thickness. Note that, however, although an area of the principal surface of the passive electrode E12_1 and an area of the principal surface of the passive electrode E12_2 are the same in size, an area of the principal surface of the active electrode E11 is significantly smaller than each of the areas of the principal surfaces of the passive electrodes E12_1 and E12_2.

The active electrode E11 is provided at the center of the one principal surface of the housing THS. Meanwhile, the passive electrodes E12_1 and E12_2 are so provided in the one principal surface of the housing THS as to sandwich the active electrode E11 in a direction along the longer sides of a rectangle that forms the one principal surface of the housing THS. The active electrode E11 and the passive electrodes E12_1 and E12_2 are disposed at the same height in a thickness direction (=vertical direction) of the housing THS.

The antenna coil 26 is so formed on a principal surface (=upper surface) of the magnetic sheet MG as to draw a spiral centered to the center of the principal surface of the magnetic sheet MG. The antenna coil 26 and the magnetic sheet MG are held in the housing THS so that the direction of the one principal surface of the magnetic sheet MG is the same as that of the one principal surface of the housing THS and a part of the antenna coil 26 overlaps with the passive electrode E12_2 when viewed from above. The antenna coil 26 is disposed at a lower position than the passive electrode E12_2.

As can be understood from the above descriptions, the passive electrode E12_2 for electric field coupling is released by the switch SW12 being turned off when wireless communication is carried out and functions as a booster antenna that is magnetically field-coupled with the antenna coil 26. This ensures high wireless communication performance even if the power transmission device 10 is miniaturized.

In the present embodiment, the switch SW11 is provided between the active electrode E11 and the one end of the secondary coil L2, and the switch SW12 is provided between the other end of the secondary coil L2 and each of the passive electrodes E12_1 and E12_2. Note that, however, the switch SW11 may be omitted and the active electrode E11 may be directly connected to the one end of the secondary coil L2. Alternatively, the switch SW12 may be omitted and the other end of the secondary coil L2 may be directly connected to the passive electrodes E12_1 and E12_2. Moreover, both the switches SW11 and SW12 may be omitted.

REFERENCE SIGNS LIST 10 power transmission device
16 control circuit
20 step-up transformer
24, 42 RF circuit
26, 40 antenna coil
30 power reception device
34 step-down transformer
44 CPU
100 power transmission system

The invention claimed is:
1. A power reception device comprising:
a feeding coil for wireless data communication;
a wireless communication circuit that includes a wireless IC chip and a feeding circuit configured to transmit and receive high frequency signals via the feeding coil;
a first electrode configured to be electrically field-coupled with a power transmission device;
a conductor member configured as a booster antenna magnetically field-coupled with the feeding coil during wireless data communication with the power transmission device and configured as a second electrode electrically field-coupled with the power transmission device when power is received from the power transmission device; and a power supply circuit coupled to the first electrode and the conductor member and configured to supply power to a load when the first electrode and the conductor member are electric field-coupled to the power transmission device.

2. The power reception device according to claim 1, wherein the power supply circuit includes a step-down transformer configured to step down an AC voltage excited when the first electrode and the conductor member are electric field-coupled to the power transmission device and a rectification circuit configured to rectify a stepped-down AC voltage.

3. The power reception device according to claim 1, further comprising at least one switch coupled between the power supply circuit and at least one of the first electrode and the conductor member.

4. The power reception device according to claim 3, wherein the at least one switch is open during wireless data communication with the power transmission device and is closed when the first electrode and the conductor member are electric field-coupled to the power transmission device.

5. The power reception device according to claim 1, wherein the first electrode comprises a smaller surface area than a surface area of the conductor member.

6. The power reception device according to claim 1, further comprising:
a power reception surface that opposes the power transmission device when the power reception device is positioned on the power transmission device,
wherein the conductor member is disposed in the power reception device a same distance or a farther distance from the power reception surface than the first electrode, and the feeding coil is disposed in the power reception device such that a portion of the conductor member is disposed between the power reception surface and at least a portion of the feeding coil.

7. The power reception device according to claim 1, wherein the conductor member is disposed in the power reception device so as to surround the first electrode.

8. The power reception device according to claim 6, wherein the feeding coil is a planar coil with a coil opening disposed in the power reception device so as to oppose the power reception surface, and the power reception device further includes a magnetic member disposed on a surface of the feeding coil that is farther from the power reception surface than the feeding coil.

9. A power transmission system comprising:
a power transmission device configured to transmit an AC voltage by electric field coupling; and
a power reception device configure to receive an AC voltage transmitted from the power transmission device by electric field coupling, the power reception device including:
a feeding coil for wireless data communication;
a wireless communication circuit that includes a wireless IC chip and a feeding circuit configured to transmit and receive high frequency signals via the feeding coil;
a first electrode configured to be electrically field-coupled with the power transmission device;
a conductor member configured as a booster antenna magnetically field-coupled with the feeding coil during wireless data communication with the power transmission device and configured as a second electrode electrically field-coupled with the power transmission device when power is received from the power transmission device; and
a power supply circuit coupled to the first electrode and the conductor member and configured to supply power to a load when the first electrode and the conductor member are electric field-coupled to the power transmission device.

10. The power transmission system according to claim 9, wherein the power reception device further comprises at least one switch coupled between the power supply circuit and at least one of the first electrode and the conductor member.

11. The power transmission system according to claim 10, wherein the at least one switch is open during wireless data communication with the power transmission device and is closed when the first electrode and the conductor member are electric field-coupled to the power transmission device.

* * * * *